United States Patent
Benney et al.

(10) Patent No.: US 6,575,408 B2
(45) Date of Patent: Jun. 10, 2003

(54) SOFT LANDING ASSEMBLY FOR A PARACHUTE

(75) Inventors: Richard J. Benney, Stow, MA (US); Glen J. Brown, Santa Cruz, CA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/853,973

(22) Filed: May 11, 2001

(65) Prior Publication Data

US 2002/0166925 A1 Nov. 14, 2002

(51) Int. Cl.⁷ .......................... B64D 17/32; B64D 17/00
(52) U.S. Cl. ........................ 244/152; 244/142
(58) Field of Search ................ 244/142, 147, 244/150, 152

(56) References Cited

U.S. PATENT DOCUMENTS

| | | | |
|---|---|---|---|
| 2,386,395 A | * 10/1945 | Hart | 244/151 R |
| 2,477,907 A | * 8/1949 | Smith | 244/139 |
| 2,483,088 A | 9/1949 | DeHaven | 254/93 |
| 2,492,501 A | * 12/1949 | Robins | 244/138 R |
| 2,730,317 A | 1/1956 | Onanian | 244/152 |
| 3,109,615 A | * 11/1963 | Fritz | 244/138 R |
| 3,387,805 A | * 6/1968 | Barnett et al. | 244/138 R |
| 3,823,600 A | 7/1974 | Wolff | 73/12 |
| 4,127,246 A | * 11/1978 | Andres | 244/138 R |
| 5,021,064 A | 6/1991 | Caines | 623/26 |
| 5,080,305 A | * 1/1992 | Stencel et al. | 102/384 |
| 6,050,524 A | * 4/2000 | Haggard | 244/151 A |
| 6,131,856 A | * 10/2000 | Brown | 244/138 R |
| 6,224,019 B1 | * 5/2001 | Peterson et al. | 244/138 R |
| 6,328,263 B1 | * 12/2001 | Benney et al. | 244/142 |

* cited by examiner

Primary Examiner—Charles T. Jordan
Assistant Examiner—Stephen A. Holzen
(74) Attorney, Agent, or Firm—Vincent J. Ranucci

(57) ABSTRACT

A soft landing assembly for a parachute includes an altitude sensor mounted on the parachute and a control assembly mounted on the parachute for activating parachute landing velocity affectors at preselected altitudes detected by the altitude sensor. A first of the parachute landing velocity affectors is an automatic riser slip actuator for providing a riser slip, and thereby horizontal velocity reduction at an optimum time and in an optimum direction. A second of the parachute landing velocity affectors is an automatic pneumatic muscle retraction actuator for providing vertical retraction of a parachutist, and thereby vertical velocity reduction of the parachutist, at an optimum time prior to impact with ground.

4 Claims, 4 Drawing Sheets

SOFT LANDING ASSEMBLY FOR A PARACHUTE

STATEMENT OF GOVERNMENT INTEREST

The invention described herein may be manufactured and used by and for the Government of the United States of America for Governmental purposes without the payment of any royalties thereon or therefor.

BACKGROUND OF THE INVENTION

1. Field of the Invention

This invention relates to parachutes and is directed more particularly to a soft landing assembly for a parachute, which assembly facilitates soft landing through automatic activation of horizontal and vertical velocity reduction prior to impact.

2. Description of the Prior Art

Parachute landing injuries often are caused by high velocity, both horizontal and vertical, at the time of impact of a parachutist with the ground. Horizontal velocity may be caused by wind, parachute oscillation, and/or incorrect application of "riser slip". The riser slip technique of manually controlling horizontal velocity is known and used by those familiar with parachute use. However, inexperienced jumpers commonly apply the technique incorrectly, resulting in injury.

In U.S. Pat. No. 6,131,856—Brown, there is discussed a trajectory control system which improves landing location accuracy. The system of Brown includes multiple actuators, each acting on a predetermined number of suspension lines to alter the lengths of the suspension lines to change the horizontal direction of a round parachute.

It is also known to use pneumatic muscles to retract, or uplift, a 'chutist just prior to impact, the upward movement of the muscle running counter to the downward fall of the parachute, reducing the overall downward velocity of the 'chutist. Again, it requires some skill and experience to properly initiate the retraction of the muscle at the precise moment of maximum effectiveness.

In U.S. Pat. No. 6,050,524—Haggard, there is shown and described a pneumatic muscle in combination with a proximity device which automatically triggers the muscle to decrease vertical velocity of the 'chutist just prior to ground impact. While the Haggard patent addresses the reduction of vertical landing velocity, it fails to address the reduction of excessive horizontal velocity.

SUMMARY OF THE INVENTION

An object of the invention is to provide a soft landing assembly for a parachute, the assembly including automatic means for compensating for both excessive horizontal velocity and excessive vertical velocity just prior to ground impact.

With the above and other objects in view, as will hereinafter appear, a feature of the present invention is the provision of a soft landing assembly for a parachute, the assembly comprising an altitude sensor mounted on the parachute, a control assembly mounted on the parachute for initiating parachute landing velocity affectors at preselected altitudes detected by the altitude sensor. A first of the parachute landing velocity affectors comprises an automatic riser slip actuator for providing a riser slip, and thereby horizontal velocity reduction at an optimum time and in an optimum direction. A second of the parachute landing velocity affectors comprises an automatic pneumatic muscle retraction actuator for providing vertical retraction of a parachutist, and thereby vertical velocity reduction of the parachutist, at an optimum time prior to impact with ground.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
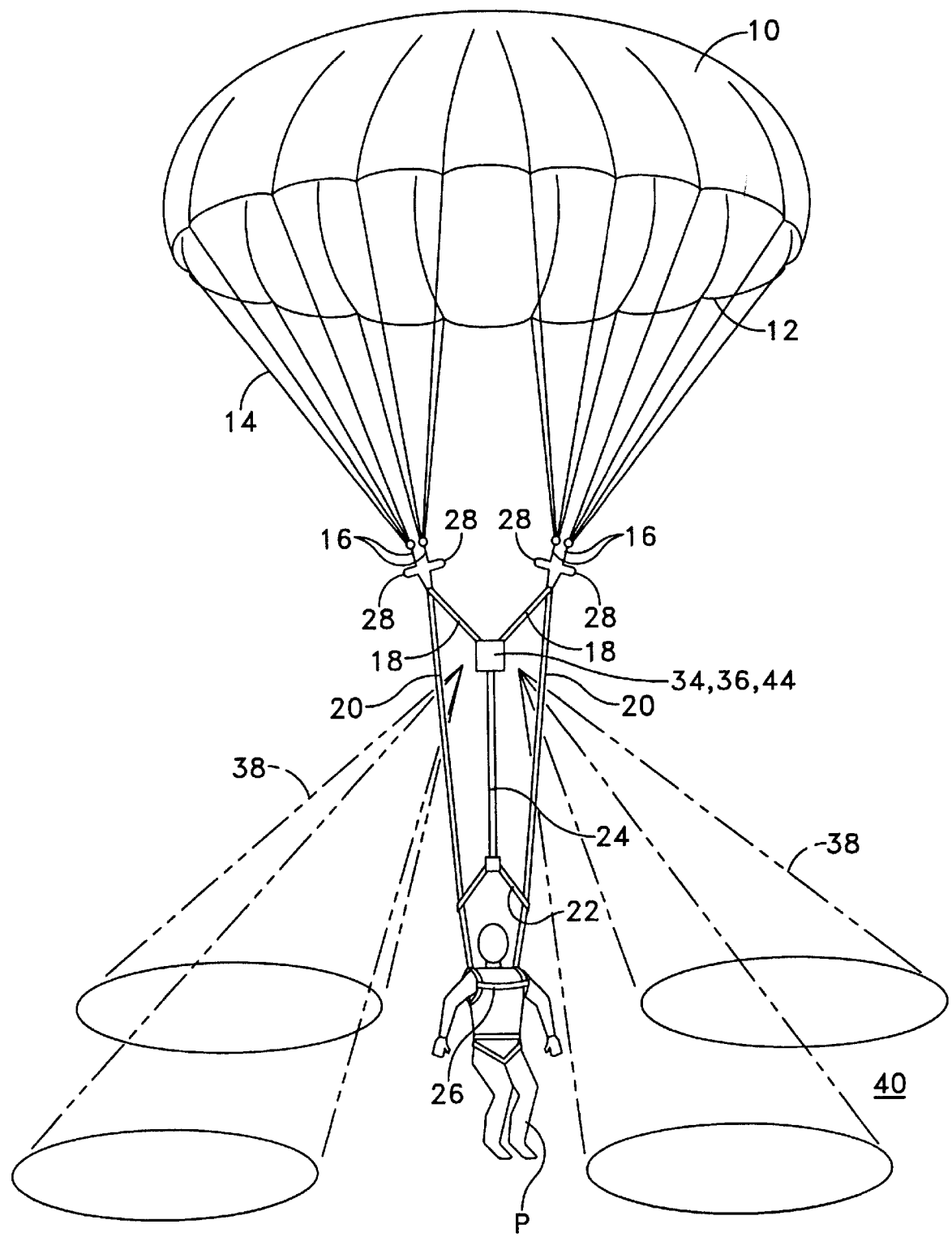
FIG. 1 is a diagrammatic illustration of one form of soft landing assembly illustrative of an embodiment of the invention.

Referring to FIG. 1, it will be seen that a typical parachute includes a canopy 10 having a skirt 12 from which extend a multiplicity of suspension lines 14. Groups of suspension lines 14 are collected together in a packed form in risers 16, typically four risers. Lower ends of the risers 16 are in turn fixed to an upper bridle 18. Riser extensions 20 extend to, and are fixed to, a lower bridle 22. Extending between the two bridles 18, 22 is a pneumatic muscle 24 which, in and of itself is known in the art. The lower ends of the riser extensions 20 are fixed to a harness 26 worn by a 'chutist P.

Figure 2:
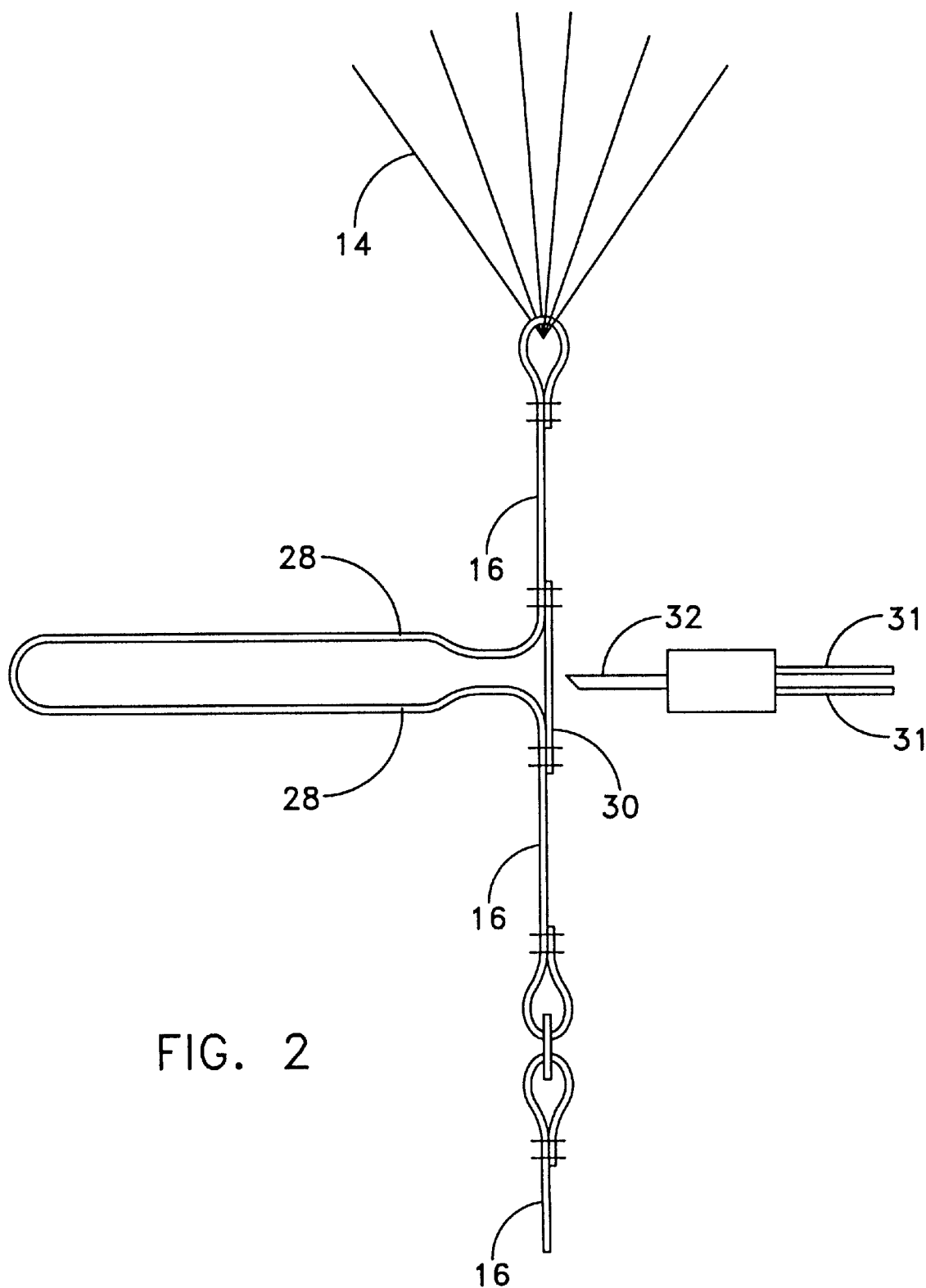
FIG. 2 is an enlarged diagrammatic illustration of one component of the assembly shown in FIG. 1.

The risers 16 each include a bound loop 28 of a portion of the riser, the loop being bound by a short length of riser webbing, or the like (FIG. 2). For each riser 16 there is provided a cutter 32 which is responsive to an electrical current passed through electrical leads 31 to cut the webbing 30 binding one of the riser loops 28. Alternatively, non-electrically activated cutters may be used and are known in the art. Upon cutting of the webbing 30, the loop 28 is no longer bound and adds to the length of its respective riser 16.

Supported by the bridle 18 is an altitude sensor 34, and control assembly 36, preferably a multi-beam radar with beams 38 directed as illustrated in FIG. 1.

Figure 3:
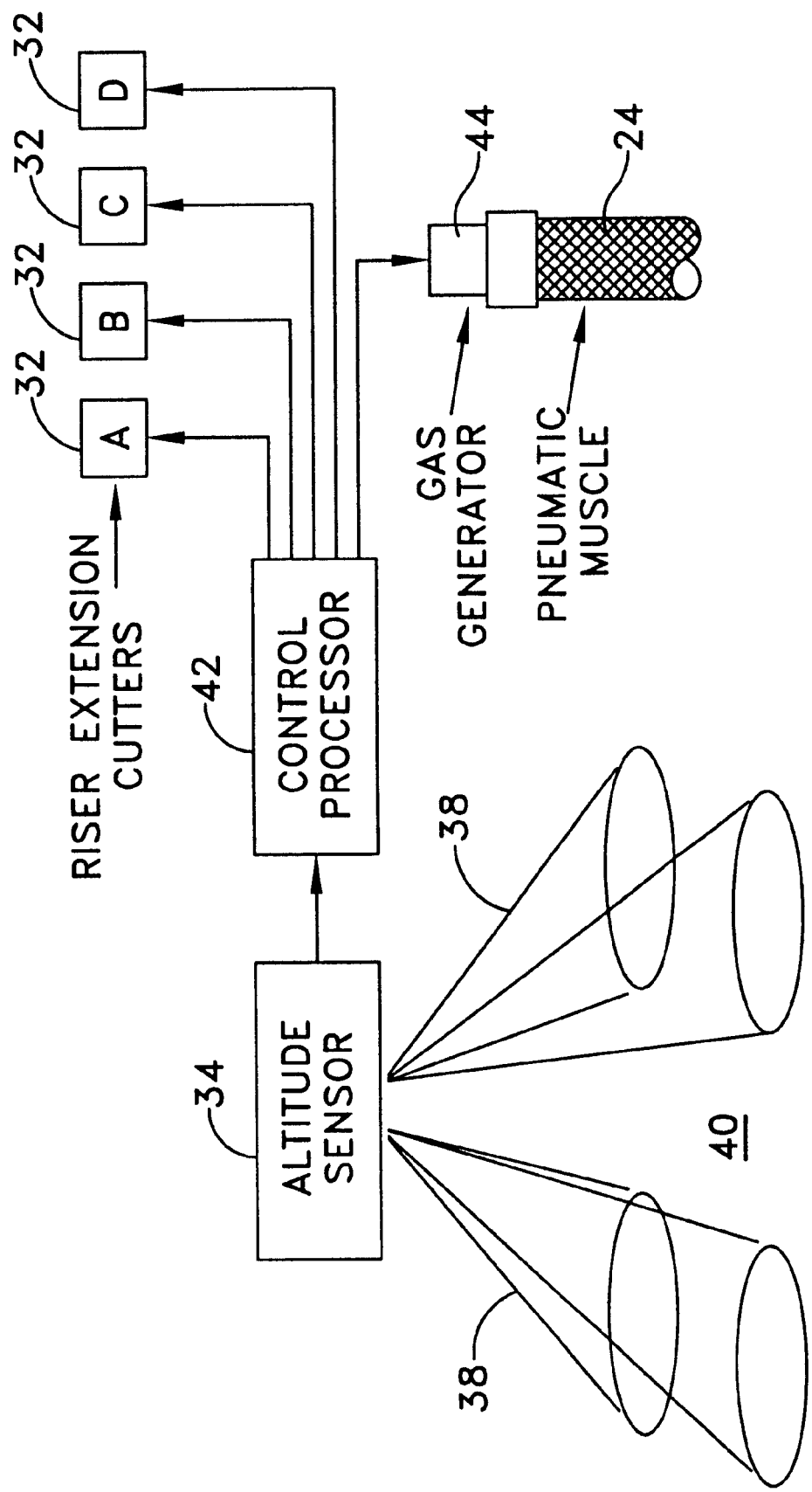
FIG. 3 is a box diagram illustrating components of the soft landing assembly.

Referring to FIG. 3, it will be seen that the altitude sensor 34 projects radar beams 38 toward the ground 40 there beneath and relays data to a control assembly processor 42 which computes altitude, rate of descent, and horizontal velocity and direction over the ground. Upon detecting a preselected horizontal velocity, the control processor 42 actuates an appropriate one, two or three of the cutters 32 to lengthen one, two or three risers 16, to effect slowing of the horizontal velocity in the direction of horizontal travel.

Upon reaching a lower preselected altitude, the control processor activates a gas generator 44 which discharges gas into the pneumatic muscle 24. Gas entering the muscle 24 causes the muscle to expand widthwise and contract lengthwise to "raise" the 'chutist relative to the parachute, such that upon contact with the ground, the 'chutist is moving at a lesser vertical velocity downwards than is the parachute, providing for a "soft" landing.

Figure 4:
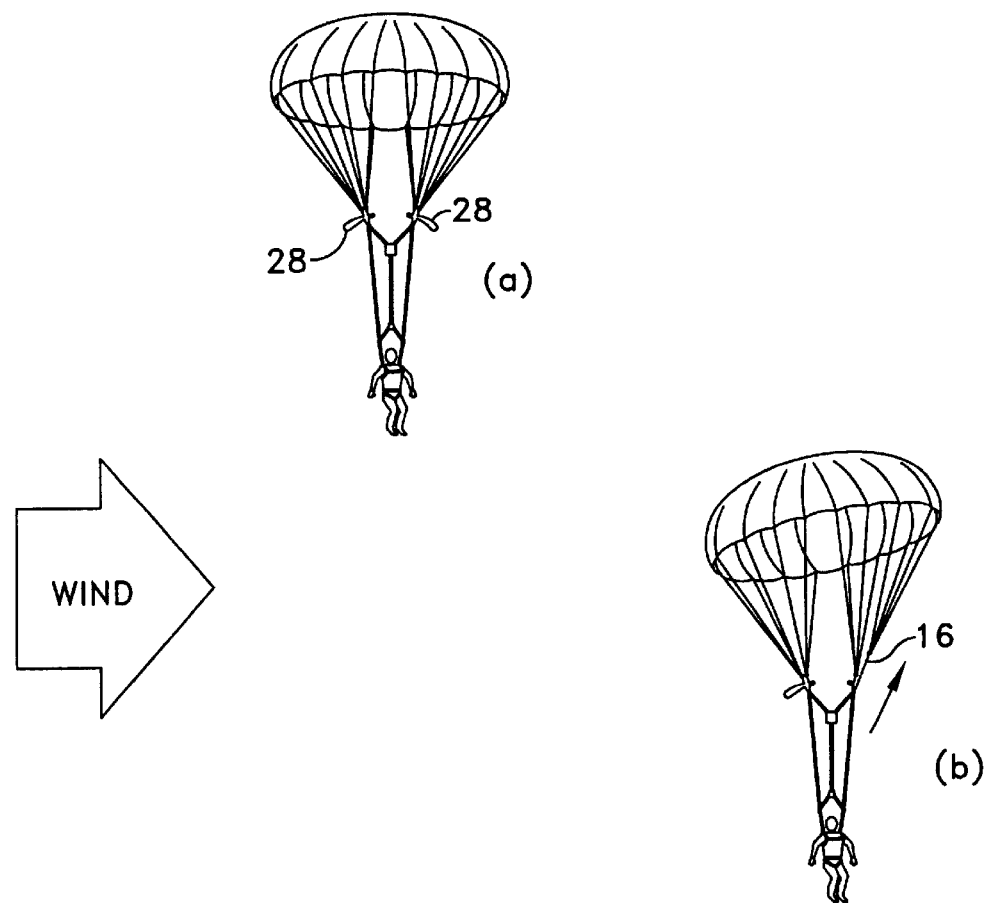
FIG. 4 is a diagrammatic illustration of a parachute and 'chutist in three stages of descent.
Figure 4:
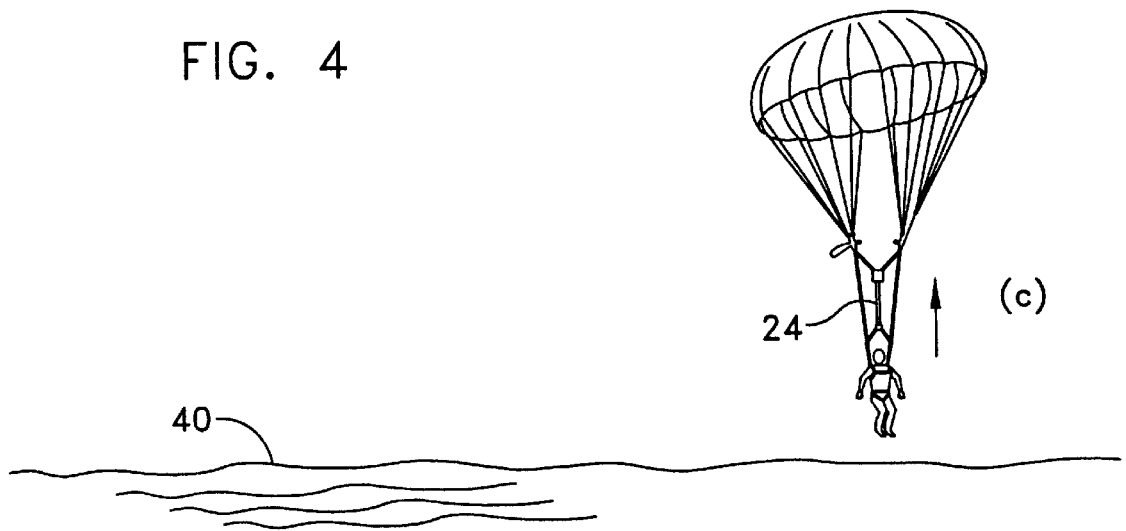

Referring to FIG. 4, there is shown diagramatically the manner in which the soft landing assembly operates. At (a) in FIG. 4, there is shown a parachute and 'chutist descending normally. The wind blowing from the left to right, as viewed in FIG. 4, moves the parachute horizontally over the ground 40 in the direction of the blowing wind.

At a first preselected altitude, as at (b), the appropriate cutter or cutters 32 are actuated to lengthen appropriate risers 16 so that the canopy 10 is tilted into the wind to reduce the velocity horizontal travel.

At a second preselected altitude, as at (c), the gas generator 44 is activated to employ the muscle 24 to reduce the vertical velocity of the 'chutist.

Typically, the first altitude is about 100 feet and the second altitude is about 5 feet, though the altitude can be varied by selection, or automatically varied according to parameters, such as temperature and atmospheric pressure, but primarily the rate of descent.

There is thus provided a soft landing assembly for a parachute, the assembly having automatic means for reducing horizontal and vertical velocities at the proper times to effect a relatively soft landing.

It is to be understood that the present invention is by no means limited to the particular construction herein disclosed and/or shown in the drawings, but also comprises any modification or equivalent within the scope of the claims.

What is claimed is:

1. A soft landing assembly for a parachute, the assembly comprising:

an altitude sensor mounted on the parachute;

a horizontal velocity sensor;

a control assembly, comprising said horizontal velocity sensor, mounted on the parachute for activating parachute landing velocity affectors at preselected altitudes detected by said altitude sensor and according to horizontal velocity detected by said horizontal velocity sensor;

a first of the parachute landing velocity affectors comprising an automatic riser slip actuator for providing a riser slip, and thereby horizontal velocity reduction, at an optimum time and in an optimum direction, said riser actuator comprising cutters for cutting free bound lengths of parachute risers selected by the control processor, to lengthen the selected parachute risers, to effect the riser slip in an appropriate direction; and a second of the parachute landing velocity affectors comprising an automatic pneumatic muscle retraction actuator for providing vertical retraction of a parachutist, and thereby vertical velocity reduction of the parachutist, at an optimum time prior to impact with ground.

2. The soft landing assembly in accordance with claim 1 wherein said altitude sensor comprises a radar device capable of generating data indicative of altitude, and horizontal velocity and direction over the ground, and vertical velocity toward the ground.

3. The soft landing assembly in accordance with claim 2 wherein said control assembly includes a control processor capable of receiving the data from said altitude sensor and computing the horizontal velocity and direction and the vertical velocity, and actuating said first and second landing velocity affectors.

4. The soft landing assembly in accordance with claim 3 wherein said control assembly further comprises a gas generator operable by said control processor and in communication with the second landing velocity affector, the second landing velocity affector comprising a pneumatic muscle adapted, upon actuation of the gas generator, to receive gas therefrom and expand widthwise and shorten lengthwise to effect the vertical velocity reduction of the parachutist prior to impact with the ground.

* * * * *